US012775385B2

(12) United States Patent
Gouldey et al.

(10) Patent No.: US 12,775,385 B2
(45) Date of Patent: Oct. 27, 2026

(54) MEMORY REQUEST COMBINATION INDICATION

(71) Applicant: SiFive, Inc., San Mateo, CA (US)

(72) Inventors: Eric Andrew Gouldey, Fort Collins, CO (US); Wesley Waylon Terpstra, San Mateo, CA (US); Andrew Waterman, Berkeley, CA (US)

(73) Assignee: SiFive, Inc., Santa Clara, CA (US)

( * ) Notice: Subject to any disclaimer, the term of this patent is extended or adjusted under 35 U.S.C. 154(b) by 98 days.

(21) Appl. No.: 18/203,901

(22) Filed: May 31, 2023

(65) Prior Publication Data

US 2024/0020012 A1 Jan. 18, 2024

Related U.S. Application Data

(60) Provisional application No. 63/388,663, filed on Jul. 13, 2022.

(51) Int. Cl.

*G06F 9/30* (2018.01)
*G06F 3/06* (2006.01)
*G06F 9/38* (2018.01)

(52) U.S. Cl.

CPC .......... *G06F 3/0613* (2013.01); *G06F 3/0659* (2013.01); *G06F 3/0673* (2013.01); *G06F 9/30043* (2013.01)

(58) Field of Classification Search

CPC ... G06F 3/0613; G06F 9/30043; G06F 9/3853
See application file for complete search history.

(56) References Cited

U.S. PATENT DOCUMENTS 11,243,773 B1 * 2/2022 Lloyd .................. G06F 9/3824
2016/0328237 A1 * 11/2016 Di ....................... G06F 9/30043
2017/0249144 A1 * 8/2017 Jaget ..................... G06F 9/3824
2019/0163475 A1 * 5/2019 King .................. G06F 9/30181
2020/0057640 A1 * 2/2020 Dunham ............. G06F 9/30087
2021/0349823 A1 * 11/2021 Karm .................... G06F 9/3854

* cited by examiner

*Primary Examiner* — Jacob Petranek
(74) *Attorney, Agent, or Firm* — Kilpatrick Townsend & Stockton LLP

(57) ABSTRACT

A processor core may include circuitry that fetches a first instruction followed by a second instruction. The first instruction may be configured to cause a first memory request, and the second instruction may be configured to cause a second memory request. The circuitry may determine that the first memory request is a candidate for combination with the second memory request. Responsive to the determination, the circuitry may send an indication, from the processor core via a bus, that the first memory request is a candidate for combination.

20 Claims, 8 Drawing Sheets

MEMORY REQUEST COMBINATION INDICATION

CROSS-REFERENCE TO RELATED APPLICATION(S)

This application claims priority to and the benefit of U.S. Provisional Patent Application Ser. No. 63/388,663, filed Jul. 13, 2022, the entire disclosure of which is hereby incorporated by reference.

TECHNICAL FIELD

This disclosure relates generally to central processing units or processor cores and, more specifically, to a memory request combination indication that may be sent from a processor core to a transaction bundler.

BACKGROUND

A central processing unit (CPU) or processor core may be implemented according to a particular microarchitecture. As used herein, a "microarchitecture" refers to the way an instruction set architecture (ISA) (e.g., the RISC-V instruction set) is implemented by a processor core. A microarchitecture may be implemented by various components, such as dispatch units, execution units, registers, caches, queues, data paths, and/or other logic associated with instruction flow. A processor core may execute instructions in a pipeline.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
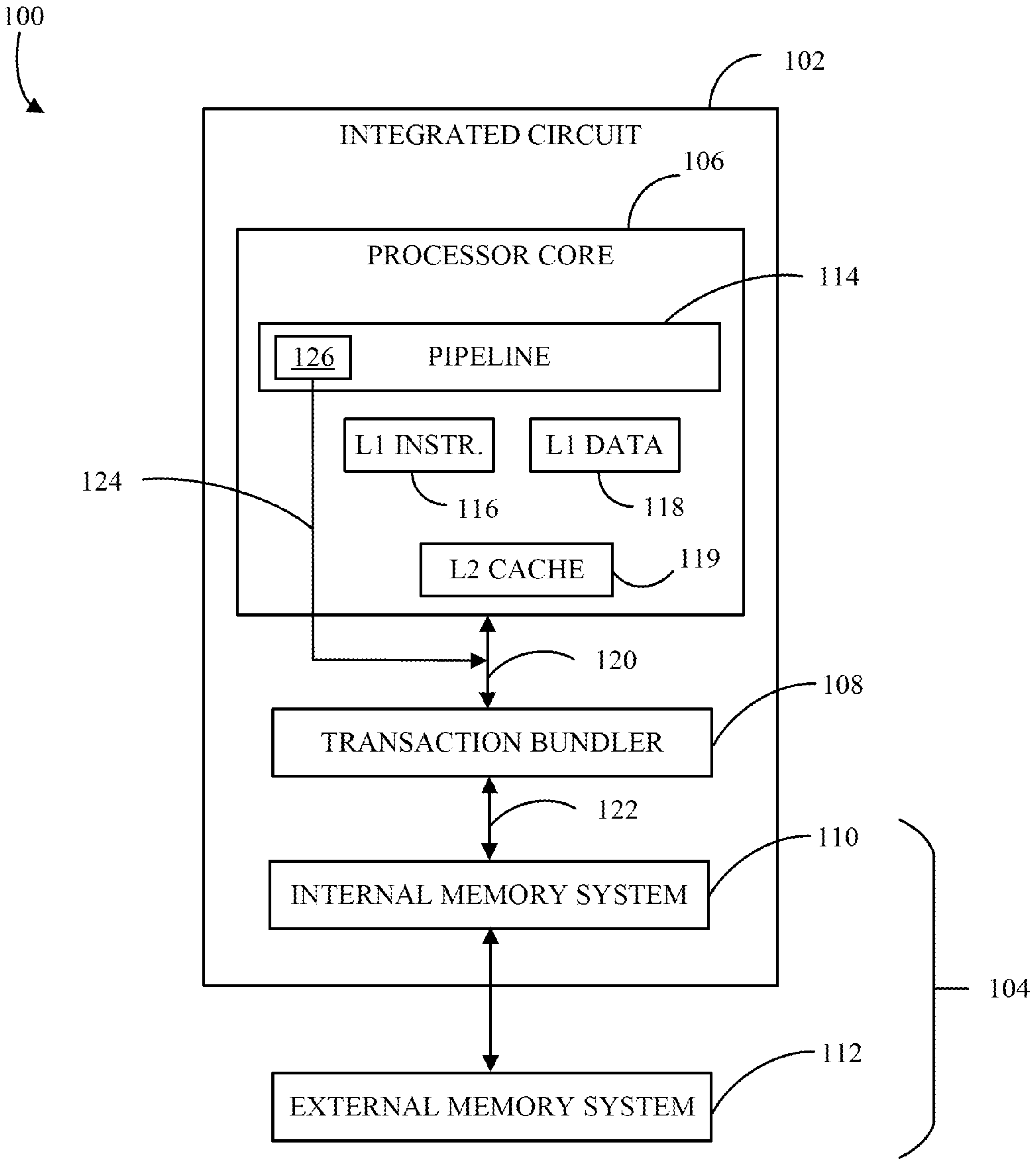
FIG. 1 is a block diagram of an example of a system including an integrated circuit and a memory system.

An Instruction Set Architecture (ISA) (such as the RISC-V ISA) may implement instructions associated with memory requests, such as commands to read or write data to memory (e.g., via a cache) or to memory-mapped I/O. The memory requests may be of different sizes, such as reads or writes of 1, 2, 4, 8, 16, 32, or 64 bytes, and may be associated with different physical addresses in memory. Implementations of a program sequence may involve numerous memory requests. Such implementations may be less efficient to the extent they may underutilize bandwidth available in a system. For example, a system bus having a bandwidth that can accommodate a transfer of 16 bytes per clock cycle may be underutilized when a memory request seeks to transfer 1, 2, 4 or 8 bytes during a clock cycle. This underutilization may cause a performance bottleneck when multiple memory requests are queued.

Implementations of this disclosure are designed to improve the efficiency of memory transactions by sending a memory request combination indication (e.g., a non-binding sequential-access-may-follow hint or speculative indication) from a processor core to a transaction bundler (e.g., a burst bundler, read combiner, or write combiner). The processor core may include circuitry that fetches a first instruction configured to cause a first memory request (e.g., a first memory read or write, which may be an earlier memory read or write) followed by a second instruction configured to cause a second memory request (e.g., a second memory read or write, which may be a later memory read or write). The circuitry may determine that the first memory request is a candidate for combination with the second memory request. Responsive to the determination, the circuitry may send the indication from the processor core via a bus. The indication may indicate that the first memory request is a candidate for combination (e.g., with another memory request, such as the second memory request). The indication may be sent to the transaction bundler that receives the first memory request and the second memory request.

For example, the circuitry may include a pipeline that includes a load/store execution unit. The first instruction may pass through the pipeline ahead of the second memory request and may be sent to the transaction bundler via the bus (or may be queued by the processor core to be sent to the transaction bundler via the bus). The second instruction may cause the indication when the second instruction is in the pipeline, such as when the second instruction enters the load/store execution unit. In some implementations, the circuitry may compare at least part of a first virtual address associated with the first instruction with at least part of a second virtual address associated with the second instruction for sending the indication. In some implementations, the circuitry may determine when a second address associated with the second instruction is adjacent to a first address associated with the first instruction, and may send the indication based on the determination. In some implementations, the circuitry may determine when a page that is addressed by the second instruction is a same page as a page that is addressed by the first instruction, and may send the indication based on the determination. In some implementations, the circuitry may determine when an offset portion of the second virtual address is adjacent to an offset portion of the first virtual address, and may send the indication based on the determination. Thus, a hint from the processor core may provide information to permit an intelligent decision by the transaction bundler as to whether the transaction bundler should wait for a subsequently arriving memory request for the possibility of more efficiently combining the subsequently arriving memory request with another memory.

The first memory request may be sent to the transaction bundler with or without the indication that the first memory request is a candidate for combination. When the indication is received, the transaction bundler may wait for a specified time period (e.g., 2, 3, 4, or 5 clock cycles) for the second memory request. If the second memory request arrives within the specified time period, and the second memory request is combinable with the first memory request, the transaction bundler may combine the first memory request with the second memory request in a combined memory request. If the second memory request does not arrive within the specified time period, the transaction bundler may transmit the first memory request (e.g., without the second memory request). If the second memory request arrives within the specified time period, and the second memory request is not combinable with the first memory request, the transaction bundler may transmit the first memory request (e.g., without combining with the second memory request), then may transmit the second memory request. In some implementations, the transaction bundler may be implemented in or with a cache controller or a memory controller, such as for scheduling accesses to cache or memory banks. In some implementations, the transaction bundler may be implemented in or with a network-on-a-chip (NoC).

As a result, the utilization of bandwidth in a system may be improved, and power consumption in the system may be reduced, by combining memory requests when possible. For example, bandwidth and/or power consumption may be improved by bundling transactions to reduce the command bandwidth needed for a same amount of data transfer. Bundling transactions may also enable command processing to operate at a slower clock frequency to achieve the same bandwidth, and/or may enable an efficient use of a wider data bus. Determining the indication in the processor core, and more specifically the load/store execution unit, may permit an early indication for the possibility of combining memory requests, which may reduce latency associated with mis-predicting when memory requests may be combined. The indication may be determined by the processor core, without additional latency, by overlapping the determination with other work being performed by the processor core. For example, the processor core may determine the indication while looking up a memory request in a local cache of the processor core and/or while performing virtual to physical address translation. This may permit the system, for example, to avoid penalizing unlikely-to-be-combined memory requests.

FIG. 1 is a block diagram of an example of a system 100 including an integrated circuit 102 and a memory system 104. The integrated circuit 102 may include a processor core 106 and a transaction bundler 108 (e.g., a burst bundler, read combiner, or write combiner). The integrated circuit 102 could be implemented, for example, as an FPGA, an ASIC, or an SoC. The memory system 104 may include an internal memory system 110 and an external memory system 112. The internal memory system 110 may be in communication with the external memory system 112. The internal memory system 110 may be internal to the integrated circuit 102 (e.g., implemented by the FPGA, the ASIC, or the SoC). The external memory system 112 may be external to integrated circuit 102 (e.g., not implemented by the FPGA, the ASIC, or the SoC). The internal memory system 110 may include, for example, a controller and memory, such as random access memory (RAM), static random access memory (SRAM), cache, and/or a cache controller, such as a level three (L3) cache and an L3 cache controller. The external memory system 112 may include, for example, a controller and memory, such as dynamic random access memory (DRAM) and a memory controller. In some implementations, the memory system 104 may include memory mapped inputs and outputs (MMIO), and may be connected to non-volatile memory, such as a disk drive, a solid-state drive, flash memory, and/or phase-change memory (PCM).

The processor core 106 may include circuitry for executing instructions, such as one or more pipelines 114, a level one (L1) instruction cache 116, an L1 data cache 118, and a level two (L2) cache 119 that may be a shared cache. The processor core 106 may fetch and execute instructions in the one or more pipelines 114, for example, as part of a program sequence. The instructions may cause memory requests (e.g., read requests and/or write requests) that the one or more pipelines 114 may transmit to the L1 instruction cache 116, the L1 data cache 118, and/or the L2 cache 119.

The processor core 106 may transmit memory requests to the transaction bundler 108. For example, the processor core 106 may transmit a memory request to the transaction bundler 108 when a memory request executed in the one or more pipelines 114 causes a miss in the L1 instruction cache 116, the L1 data cache 118, and/or the L2 cache 119. The processor core 106 may communicate with the transaction bundler 108, via a first bus 120, to transmit the memory requests. For example, the processor core 106 may communicate with the transaction bundler 108, via the first bus 120, to transmit read requests for reading data from the memory system 104 and/or to transmit write requests for writing data to the memory system 104. The transaction bundler 108, in turn, may transmit responses back to the processor core 106 via the first bus 120. For example, the transaction bundler 108 may transmit data to the processor core 106 to fulfill the read requests from the memory system 104 and/or may transmit acknowledgements to the processor core 106 to acknowledge the write requests to the memory system 104.

The transaction bundler 108 may communicate with the memory system 104 via a second bus 122. The transaction bundler 108 may communicate with the memory system 104 to fulfill memory requests for the processor core 106. For example, the transaction bundler 108 may communicate with the memory system 104 (e.g., the internal memory system 110) to transmit read requests for reading data from the memory system 104 and/or to transmit write requests for writing data to the memory system 104. The memory system 104 (e.g., the internal memory system 110), in turn, may transmit responses back to the transaction bundler 108 via the second bus 122. For example, the memory system 104 may transmit data to the transaction bundler 108 to fulfill the read requests for the processor core 106 and/or may transmit acknowledgements to the transaction bundler 108 to acknowledge the write requests for the processor core 106.

Implementations of this disclosure are designed to improve the efficiency of memory transactions in the system 100 by sending an indication 124 (e.g., a non-binding sequential-access-may-follow hint or speculative indication) from the processor core 106 to the transaction bundler 108. The indication 124 may be generated by indication circuitry 126 implemented by the processor core 106. In some implementations, the indication circuitry 126 may be connected to, or may be configured as part of, a load/store execution unit of the one or more pipelines 114. The processor core may fetch and execute, via the one or more pipelines 114, a first instruction configured to cause a first memory request (e.g., a first memory read or write, which may be an earlier memory read or write) followed by a second instruction configured to cause a second memory request (e.g., a second memory read or write, which may be a later memory read or write). The indication circuitry 126 may determine that the first memory request is a candidate for combination with the second memory request. For example, the indication circuitry 126 may use virtual addresses associated with the first and second instructions to speculate that the first and second memory requests could be combined. Responsive to the determination, the indication circuitry 126 may send the indication 124 from the processor core 106 to the transaction bundler 108 via the first bus 120. For example, the indication 124 may be sent as part of a message that communicates the first memory request to the transaction bundler 108 (e.g., setting a bit in the message). The indication 124 may indicate to the transaction bundler 108 that the first memory request is a candidate for combination (e.g., with another memory request, such as the second memory request).

For example, the first instruction may pass through the one or more pipelines 114 ahead of the second memory request and may be sent to the transaction bundler 108 via the first bus 120 (or may be queued by the processor core 106 to be sent to the transaction bundler 108 via the first bus 120). The second instruction may cause the indication 124 to be sent when the second instruction is in the one or more pipelines 114, such as when the second instruction enters the load/store execution unit. In some implementations, the indication circuitry 126 may compare at least part of a first virtual address associated with the first instruction with at least part of a second virtual address associated with the second instruction for sending the indication 124. In some implementations, the indication circuitry 126 may determine when a second address associated with the second instruction is adjacent to a first address associated with the first instruction, and may send the indication 124 based on the determination. In some implementations, the indication circuitry 126 may determine when a page that is addressed by the second instruction is a same page as a page that is addressed by the first instruction, and may send the indication 124 based on the determination. In some implementations, the indication circuitry 126 may determine when an offset portion of the second virtual address is adjacent to an offset portion of the first virtual address, and may send the indication 124 based on the determination. Thus, a hint from the processor core 106 may provide information to permit an intelligent decision by the transaction bundler 108 as to whether the transaction bundler 108 should wait for a subsequently arriving memory request for the possibility of more efficiently combining the subsequently arriving memory request with another memory.

The first memory request may be sent to the transaction bundler 108 with or without the indication 124 that the first memory request is a candidate for combination. When the indication 124 is received by the transaction bundler 108, the transaction bundler 108 bundler may wait for a specified time period (e.g., 2, 3, 4, or 5 clock cycles) for the second memory request. If the second memory request arrives at the transaction bundler 108 within the specified time period, and the transaction bundler 108 determines that the second memory request is combinable with the first memory request (e.g., based on the physical addresses of the first and second memory requests), the transaction bundler 108 may combine the first memory request with the second memory request in a combined memory request that is sent to the memory system 104 via the second bus 122 (and thus providing a performance benefit). If the second memory request does not arrive at the transaction bundler 108 within the specified time period, the transaction bundler 108 may transmit the first memory request (e.g., without the second memory request) to the memory system 104 via the second bus 122 (with a latency penalty limited by the specified time period). If the second memory request arrives at the transaction bundler 108 within the specified time period, and the transaction bundler 108 determines that the second memory request is not combinable with the first memory request (e.g., based on differences between the physical addresses of the first and second memory requests), the transaction bundler 108 may transmit the first memory request (e.g., without combining with the second memory request) to the memory system 104 via the second bus 122 (with a latency penalty limited by the specified time period), then may transmit the second memory request to the memory system 104 via the second bus 122. In some implementations, when the indication 124 is received by the transaction bundler 108, the transaction bundler 108 may speculatively widen the first memory request to accommodate the second memory request in the combined memory request (e.g., the indication 124 may be used as basis for speculation to widen the memory request without waiting for the arrival of the second memory request).

Thus, the transaction bundler 108 may serve as an adapter between the processor core 106 and the memory system 104. As a result, the utilization of bandwidth over the second bus 122 may be improved, and power consumption in the system 100 may be reduced, by combining memory requests (e.g., the first memory request and the second memory request) when possible. Determining the indication 124 in the processor core 106, and more specifically the load/store execution unit, may permit an early indication for the possibility of combining memory requests, which may reduce latency associated with mis-predicting when memory requests may be combined. The indication 124 may be determined by the processor core 106, without additional latency, by overlapping the determination with other work being performed by the processor core 106. For example, the processor core 106 may determine the indication 124 while looking up the second memory request in a local cache of the processor core 106 (e.g., the L1 instruction cache 116, the L1 data cache 118, and/or the L2 cache 119) and/or while performing virtual to physical address translation for a memory address associated with the second instruction. This may permit the system 100, for example, to avoid penalizing unlikely-to-be-combined memory requests.

In some implementations, multiple memory requests may be combined by the transaction bundler 108 based on multiple indications. For example, the transaction bundler 108 may receive a first memory request and a first indication (e.g., a first assertion of the indication 124), followed by a second memory request, within the specified time period, and a second indication (e.g., a second assertion of the indication 124), followed by a third memory request within the specified time period. The first indication may cause the transaction bundler 108 to wait for the specified time period for the second memory request, and second indication may cause the transaction bundler 108 to wait for the specified time period for the third memory request. If the transaction bundler 108 determines that the first, second, and third memory requests are combinable, the transaction bundler 108 may combine the first, second, and third memory requests in a combined memory request that is sent to the memory system 104 via the second bus 122. It should be appreciated that any number of memory requests may be combined based on one indication or multiple indications. That is, the disclosure is not limited to any upper bound on the number of memory requests that could be combined.

In some implementations, memory requests of different sizes may be combined by the transaction bundler 108. For example, the transaction bundler 108 may receive a first memory request that is an 8 byte request, and the indication 124, followed by a second memory request that is a 4 byte request within the specified time period. If the transaction bundler 108 determines that the 8 byte request and the 4 byte request are combinable, the transaction bundler 108 may combine the 8 byte request and the 4 byte request in a combined memory request, that is a 12 byte request, sent to the memory system 104 via the second bus 122. For example, the transaction bundler 108 may determine that the first and second memory requests are combinable based on the first and second memory requests both being read requests (or both being write requests) and the bandwidth over the second bus 122 (e.g., 16 bytes) being equal to or greater than a data size associated with a combination of the first and second memory requests (e.g., a 12 byte request).

Figure 2:
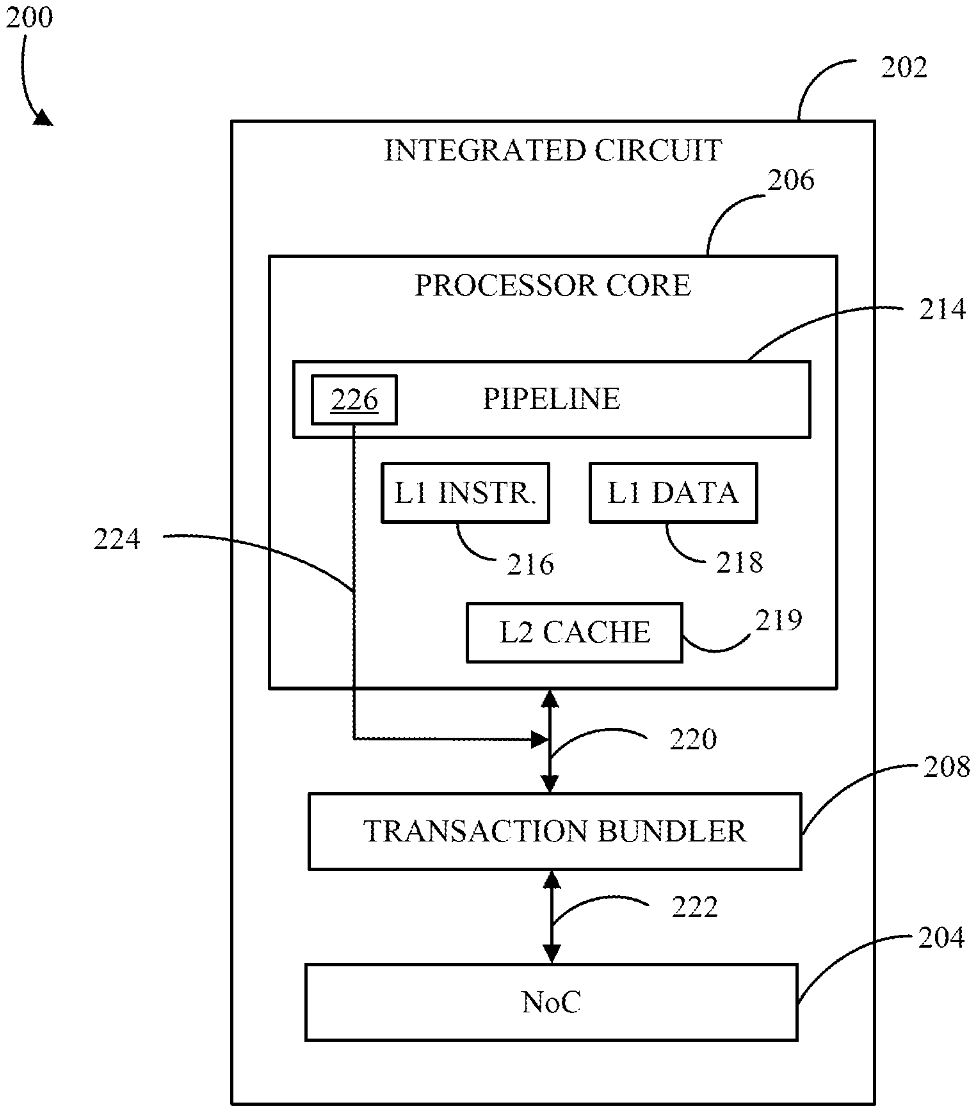
FIG. 2 is a block diagram of an example of a system including an integrated circuit comprising a network-on-a-chip.

FIG. 2 is a block diagram of an example of a system 200 including an integrated circuit 202 comprising a network-on-a-chip (NoC) 204. The integrated circuit 202 may include a processor core 206 and a transaction bundler 208. The processor core 206 may include circuitry for executing instructions, such as one or more pipelines 214, an L1 instruction cache 216, an L1 data cache 218, and an L2 cache 219. The processor core 206, the one or more pipelines 214, the L1 instruction cache 216, the L1 data cache 218, the L2 cache 219, and the transaction bundler 208 may be like the processor core 106, the one or more pipelines 114, the L1 instruction cache 116, the L1 data cache 118, the L2 cache 119, and the transaction bundler 108 shown in FIG. 1. The integrated circuit 202 could be implemented, for example, as an FPGA, an ASIC, or an SoC. The NoC 204 may be internal to the integrated circuit 202 (e.g., the NoC 204 may be implemented by the FPGA, the ASIC, or the SoC). The NoC 204 may be in communication with a memory system (not shown) like the memory system 104 shown in FIG. 1.

The processor core 206 may transmit a first memory request via the first bus 220. The first memory request may be sent to the transaction bundler 208 with or without the indication 224 that the first memory request is a candidate for combination. When the indication 224 is received by the transaction bundler 208, the transaction bundler 208 bundler may wait for a specified time period (e.g., 2, 3, 4, or 5 clock cycles) for the second memory request from the processor core 206. If the second memory request arrives at the transaction bundler 208 within the specified time period, and the transaction bundler 208 determines that the second memory request is combinable with the first memory request, the transaction bundler 208 may combine the first memory request with the second memory request in a combined memory request that is sent to the NoC 204 via a second bus 222. If the second memory request does not arrive at the transaction bundler 208 within the specified time period, the transaction bundler 208 may transmit the first memory request (e.g., without the second memory request) to the NoC 204 via the second bus 222. If the second memory request arrives at the transaction bundler 208 within the specified time period, and the transaction bundler 208 determines that the second memory request is not combinable with the first memory request, the transaction bundler 208 may transmit the first memory request (e.g., without combining with the second memory request) to the NoC 204 via the second bus 222, then may transmit the second memory request to the NoC 204 via the second bus 222.

Thus, the transaction bundler 208 may serve as an adapter between the processor core 206 and the NoC 204. As a result, the utilization of bandwidth over the second bus 222 may be improved for the NoC 204, and power consumption in the system 200 may be reduced, by combining memory requests (e.g., the first memory request and the second memory request) when possible. Determining the indication 224 in the processor core 206, and more specifically the load/store execution unit, may permit an early indication for the possibility of combining memory requests to the NoC 204, which may reduce latency associated with mis-predicting when memory requests may be combined. The indication 224 may be determined by the processor core 206, without additional latency, by overlapping the determination with other work being performed by the processor core 206. For example, the processor core 206 may determine the indication 224 while looking up the second memory request in a local cache of the processor core 206 (e.g., the L1 instruction cache 216, the L1 data cache 218, and/or the L2 cache 219) and/or while performing virtual to physical address translation for a memory address associated with the second instruction. This may permit the system 200, for example, to avoid penalizing unlikely-to-be-combined memory requests.

Figure 3:
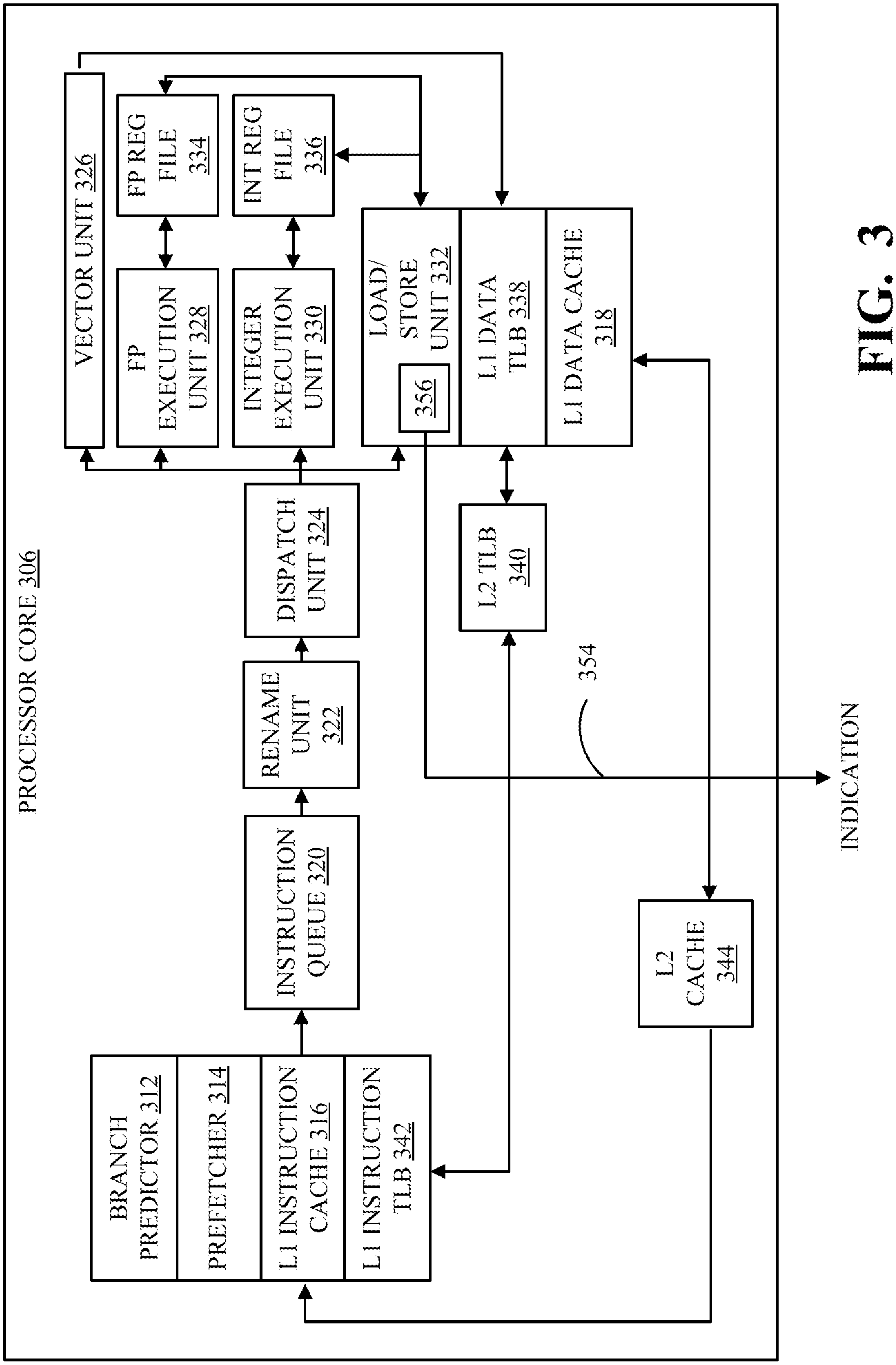
FIG. 3 is a block diagram of an example of a processor core.

FIG. 3 is a block diagram of an example of a processor core 306. The processor core 306 may be like the processor core 106 shown in FIG. 1 or the processor core 206 shown in FIG. 2. The processor core 306 may implement a micro-architecture. The processor core 306 may be configured to fetch, decode, and execute instructions of an instruction set instruction set architecture (ISA) (e.g., the RISC-V instruction set) in pipelined data paths like the one or more pipelines 114 shown in FIG. 1 or the one or more pipelines 214 shown in FIG. 2. The instructions may execute speculatively and out-of-order in the processor core 306. The processor core 306 may be a compute device, a microprocessor, a microcontroller, or a semiconductor intellectual property (IP) core or block. The processor core 306 may be implemented by an integrated circuit like the integrated circuit 102 shown in FIG. 1 or the integrated circuit 202 shown in FIG. 2. In some implementations, the processor core 306 may be implemented by the integrated circuit with one or more additional processor cores in a cluster that is connected via an interconnection network.

The processor core 306 may implement components of the microarchitecture (e.g., dispatch units, execution units, vector units, registers, caches, queues, data paths, and/or other logic associated with instruction flow, such as prefetchers and branch predictors as discussed herein). For example, the processor core 306 can include an L1 instruction cache 316 like the L1 instruction cache 116 shown in FIG. 1 or the L1 instruction cache 216 shown in FIG. 2. The L1 instruction cache 316 may be associated with an L1 translation lookaside buffer (TLB) 310, such as for virtual-to-physical address translation. An instruction queue 320, which may be a first in, first out (FIFO) queue, may buffer instructions fetched from the L1 instruction cache 316. The instructions may be fetched according to a branch predictor 312, a prefetcher 314, and/or other instruction fetch processing. For example, the branch predictor 312 may implement a branch prediction policy, which may control speculative execution of instructions (e.g., a level of aggressiveness associated with a prediction of instructions to be executed). For example, the prefetcher 314 may implement a prefetch policy, such as a number of streams that the prefetcher will track, a distance associated with a fetch, a window associated with a fetch, allowing a linear to exponentially increasing distance, and/or a size associated with a fetch.

Dequeued instructions (e.g., instructions exiting the instruction queue 320) may be renamed in a rename unit 322 (e.g., to avoid false data dependencies) and then dispatched by a dispatch unit 324 to appropriate backend execution units. The dispatch unit 324 may implement a dispatch policy, such as an simultaneous multithreading (SMT) instruction policy and/or a clustering algorithm. For example, the dispatch unit 324 may control a number of instructions to be executed by the processor core 106 per clock cycle. The backend execution units may include a vector unit 326. The vector unit 326 may include one or more execution units configured to execute vector instructions (e.g., instructions that operate on multiple data elements at the same time). The vector unit 326 may be allocated physical registers in a vector register file. The backend execution units may also include a floating point (FP) execution unit 328, an integer (INT) execution unit 330, and/or a load/store execution unit 332. The FP execution unit 328, the INT execution unit 330, and the load/store execution unit 332 may be configured to execute scalar instructions (e.g., instructions that operate on one data element at a time). The FP execution unit 328 may be allocated physical registers (e.g., FP registers) in an FP register file 334, and the INT execution unit 330 may be allocated physical registers (e.g., INT registers) in an INT register file 336. The FP register file 334 and the INT register file 336 may also be connected to the load/store execution unit 332. The load/store execution unit 332 and the vector unit 326 may access an L1 data cache 318 like the L1 data cache 118 shown in FIG. 1 or L1 data cache 218 shown in FIG. 2. The load/store execution unit 332 and the vector unit 326 may access an L1 data cache 318 via an L1 data TLB 338. The L1 data TLB 338 may be connected to a level two (L2) TLB 340, which in turn may be connected to the L1 instruction TLB 342. The L1 data cache 318 may be connected to an L2 cache 344, which may be connected to the L1 instruction cache 316. The L2 cache 344 may be like the L2 cache 119 shown in FIG. 1 or the L2 cache 219 shown in FIG. 2. The L2 cache 344 may be configured to communicate with a memory system like the memory system 104 shown in FIG. 1, or may be configured to communicate with a NoC like the NoC 204 shown in FIG. 2. In some implementations, the caches (e.g., the L1 instruction cache 316, the L1 data cache 318, and/or the L2 cache 344) may be configured with respect to cache coherence protocols. Thus, in one example, a pipeline implemented by the processor core 306 may include the instruction queue 320, the rename unit 322, the dispatch unit 324, and the load/store execution unit 332.

The processor core may send an indication 354 like the indication 124 shown in FIG. 1 or the indication 224 shown in FIG. 2. The indication 354 may be generated by indication circuitry 356 (e.g., like the indication circuitry 126 shown in FIG. 1 or the indication circuitry 226 shown in FIG. 2) implemented by the processor core 306. In some implementations, the indication circuitry 356 may be connected to, or may be configured as part of, the load/store execution unit 332. The processor core 306 may fetch and execute, via a pipeline, a first instruction configured to cause a first memory request (e.g., a first memory read or write, which may be an earlier memory read or write) followed by a second instruction configured to cause a second memory request (e.g., a second memory read or write, which may be a later memory read or write). The indication circuitry 356 may determine that the first memory request is a candidate for combination with the second memory request. Responsive to the determination, the indication circuitry 356 may send the indication 354 from the processor core 306 to a transaction bundler (e.g., like the transaction bundler 108 shown in FIG. 1 or the transaction bundler 208 shown in FIG. 2). The indication 354 may indicate to the transaction bundler that the first memory request is a candidate for combination (e.g., with another memory request, such as the second memory request). The indication 354 may be sent as part of a message that communicates the first memory request to the transaction bundler (e.g., setting a bit in the message). For example, the first instruction may pass through the instruction queue 320, the rename unit 322, the dispatch unit 324, and the load/store execution unit 332 ahead of the second memory request, and may cause a first memory request to be sent to the transaction bundler or queued to be sent to the transaction bundler. The second instruction, coming after the first instruction, may cause the indication 354 to be sent when the second instruction enters the load/store execution unit 332.

The processing core 306 and each component in the processing core 306 is illustrative and can include additional, fewer, or different components which may be similarly or differently architected without departing from the scope of the specification and claims herein. Moreover, the illustrated components can perform other functions without departing from the scope of the specification and claims herein.

Figure 4:
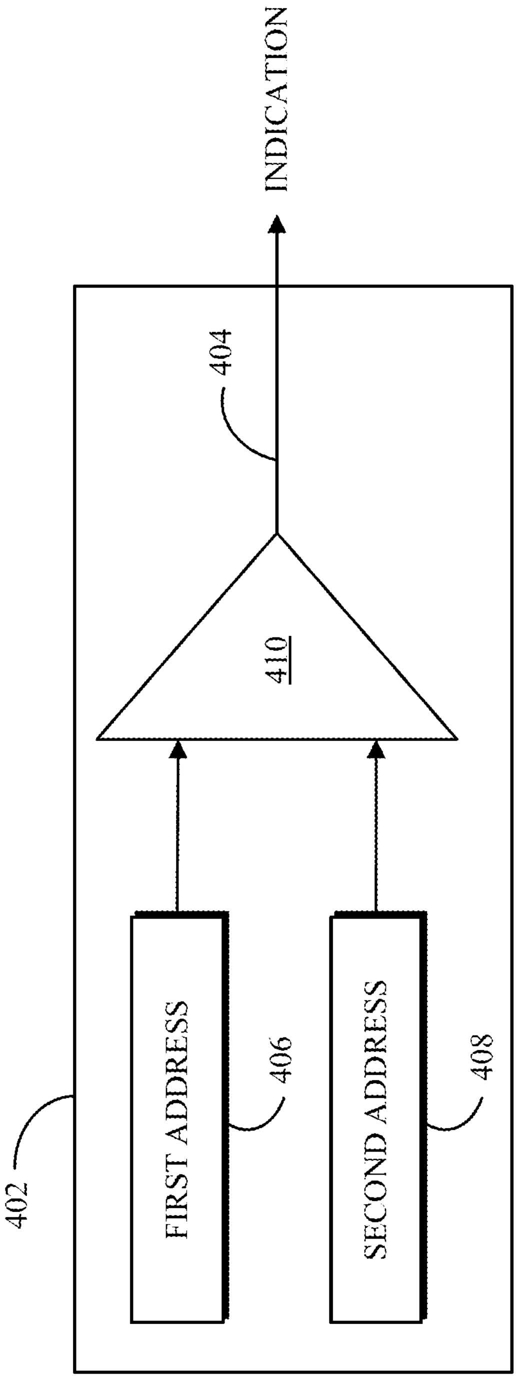
FIG. 4 is a block diagram of indication circuitry for sending an indication that a first memory request is a candidate for combination.

FIG. 4 is a block diagram of indication circuitry 402 for sending an indication 404 that a first memory request is a candidate for combination (e.g., with another memory request, such as a second memory request). The indication circuitry 402 and the indication 404 may be like the indication circuitry 126 and the indication 124 shown in FIG. 1, the indication circuitry 226 and the indication 224 shown in FIG. 2, or the indication circuitry 356 and the indication 354 shown in FIG. 3. In some implementations, the indication circuitry 402 may be connected to, or may be configured as part of, a load/store execution unit in a pipeline implemented by a processor core (e.g., the load/store execution unit 332). In one example, the indication circuitry 402 may include a first buffer 406 (or first set of latches), a second buffer 408 (or second set of latches), and a comparator 410.

The processor core may fetch and execute, via the pipeline, a first instruction configured to cause a first memory request (e.g., a first memory read or write, which may be an earlier memory read or write). The first buffer 406 may store at least part of a first virtual address associated with the first instruction. The processor core may then fetch a second instruction configured to cause a second memory request (e.g., a second memory read or write, which may be a later memory read or write). The second buffer 408 may store at least part of a second virtual address associated with the second instruction. The comparator 410 may compare the at least part of the first virtual address with the at least part of the second virtual address. If the at least part of the first virtual address equals the at least part of the second virtual address, the comparator 410 may send the indication 404. If the at least part of the first virtual address does not equal the at least part of the second virtual address, the comparator 410 does not send the indication 404. Thus, the processor core, via the indication circuitry 402, may speculate, at a relatively early stage using virtual addresses, whether there is a probability that the first and second memory requests will be directed to physical addresses that are consecutive addresses, or addresses on a same page, and should therefore be combined in a combined memory request.

Figure 5:
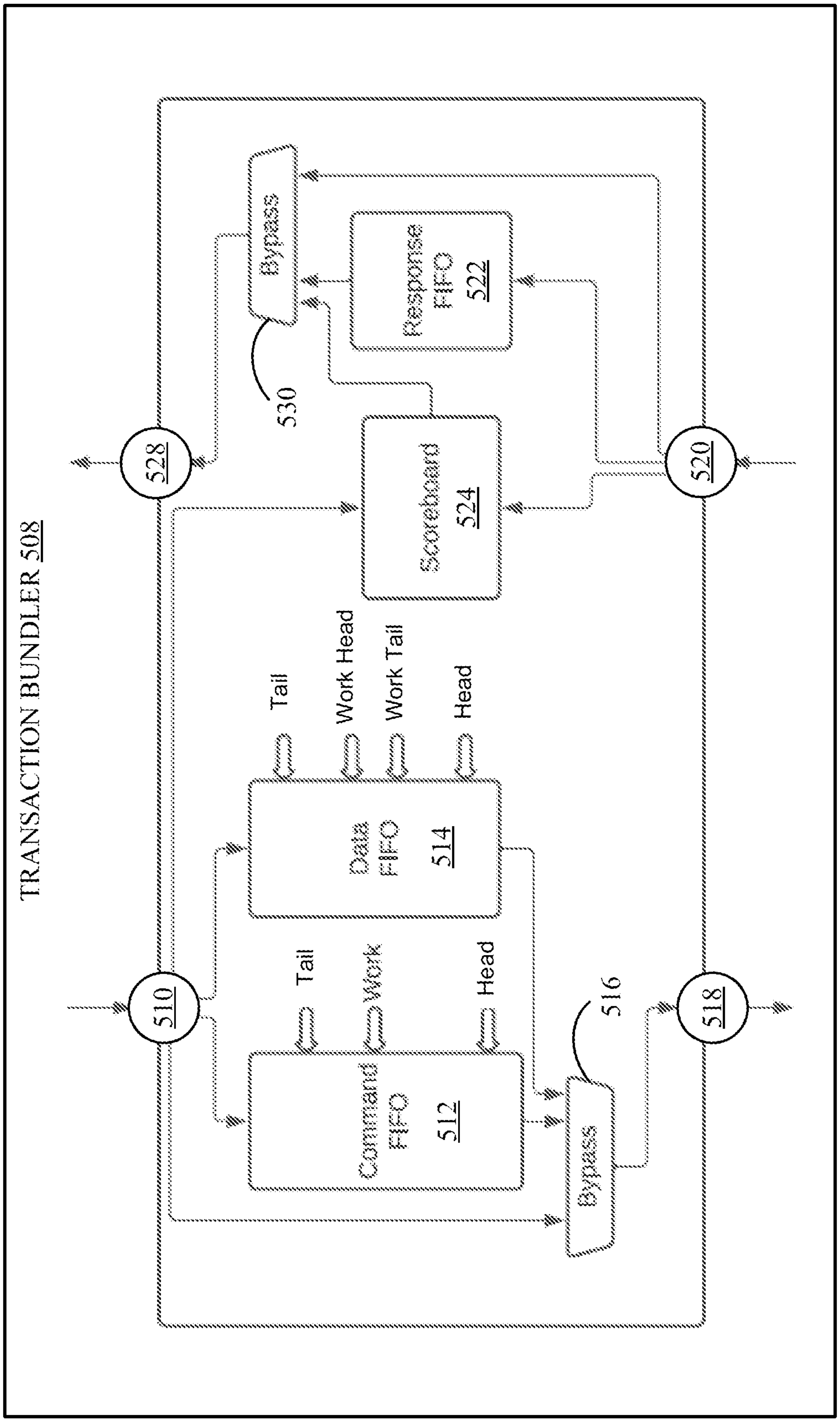
FIG. 5 is a block diagram of an example of a transaction bundler.

FIG. 5 is a block diagram of an example of a transaction bundler 508. The transaction bundler 508 may be like the transaction bundler 108 shown in FIG. 1 or the transaction bundler 208 shown in FIG. 2. At 510, the transaction bundler 508 may receive memory requests from a processor core (e.g., the processor core 106, the processor core 206, or the processor core 306). The transaction bundler 508 may receive the memory requests via a first bus (e.g., the first bus 120 or the first bus 220). At 510, the transaction bundler 508 may also receive indications (e.g., the indication 124, the indication 224, or the indication 35) from the processor core via the first bus. An indication may be associated with a memory request that the transaction bundler 508 has received, or will receive, such as a first memory request. An indication may be sent to the transaction bundler 508 to cause the transaction bundler 508 to wait for a specified period of time for the possibility of combining the first memory request with another memory request that is being processed by the processor core, such as a second memory request. The specified period of time may be configurable (e.g., 2, 3, 4, or 5 clock cycles).

When the indication is received in connection with a first memory request, the transaction bundler 508 may queue the first memory request in a command first in, first out (FIFO) queue 512 and/or a data FIFO queue 514 (e.g., from "head" to "tail"). The command FIFO queue 512 may store command information associated with the memory request (e.g., whether the memory request is a read or write, the physical address associated with the memory request, and the size of the memory request), and the data FIFO queue 514 may store data associated with the memory request (e.g., 1, 2, 4, 8, 16, 32, or 64 bytes). The command FIFO queue 512 and the data FIFO queue 514 may maintain an order of memory requests that may be combinable.

The transaction bundler 508 may wait for the specified time period for the second memory request. If the second memory request arrives within the specified time period, and the transaction bundler 508 determines that the second memory request is combinable with the first memory request, the transaction bundler may combine the first memory request with the second memory request in a combined memory request. If the second memory request does not arrive within the specified time period, at 518 the transaction bundler 508 may transmit the first memory request (e.g., without the second memory request). If the second memory request arrives within the specified time period, and the transaction bundler 508 determines that the second memory request is not combinable with the first memory request, at 518 the transaction bundler 508 may transmit the first memory request (e.g., without combining with the second memory request), then may transmit the second memory request. A memory request that is not combined with another memory request may bypass the command FIFO queue 512 and/or a data FIFO queue 514 via a first bypass 516.

At 518, the transaction bundler 508 may transmit the memory requests, including combined memory requests based on indications, to a memory system (e.g., the memory system 104) or an NoC (e.g., the NoC 204). The transaction bundler 508 may transmit the memory requests via a second bus (e.g., the second bus 122 or the second bus 222). At 520, the transaction bundler 508 may receive responses to the memory requests, including responses to combined memory requests, from the memory system or the NoC via the second bus. The transaction bundler 508 may queue the responses in a response FIFO queue 522. The response FIFO queue 522 may permit holding a response having completions that span multiple clock cycles (e.g., a read of 32 bytes in which a first completion of 16 bytes is received in a first clock cycle and a second completion of 16 bytes is received in a second clock cycle). The completions may be tracked to a response by a scoreboard 524. At 528, when the completions for a response to a memory request are received, the response may be sent to the processor core via the first bus. A response to a memory request that has not been combined may bypass the response FIFO queue 522, via a second bypass 530, and may be sent to the processor core, via the first bus, at 528.

Figure 6:
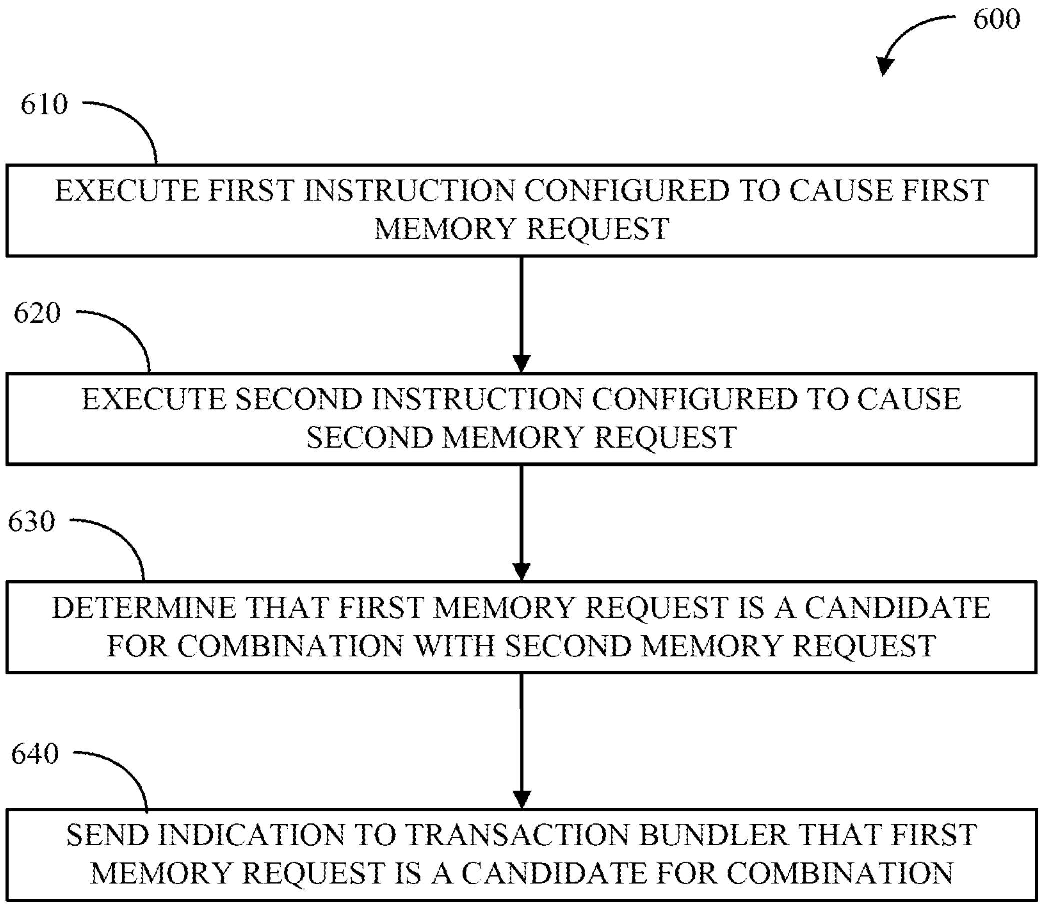
FIG. 6 is a flow chart of an example of a technique for sending an indication that a first memory request is a candidate for combination.

FIG. 6 is a flow chart of an example of a technique 600 for sending an indication that a first memory request is a candidate for combination (e.g., with another memory request, such as a second memory request). At 610, a processor core (e.g., the processor core 106, the processor core 206, or the processor core 306) may fetch a first instruction configured to cause a first memory request. For example, the processor core may include circuitry (e.g., one or more pipelines that include a load/store execution unit) that may fetch and execute the first instruction. The first memory request may be a first memory read or a first memory write and may be an earlier memory request.

At 620, the processor core may fetch a second instruction configured to cause a second memory request. For example, the circuitry (e.g., the one or more pipelines that include the load/store execution unit) may fetch the second instruction The second memory request may be a second memory read or a second memory write and may be a later memory request. The first instruction may pass through the one or more pipeline ahead of the second memory request. The first memory request may be sent, or may be queued to be sent, to a transaction bundler (e.g., the transaction bundler 190, the transaction bundler 290, or the transaction bundler 490) via a first bus (e.g., the first bus 120 or the first bus 220) when the circuitry is executing the second instruction.

At 630, the processor core may determine that the first memory request is a candidate for combination with the second memory request via indication circuitry (e.g., the indication circuitry 402). For example, the processor core may compare at least part of a first virtual address associated with the first instruction with at least part of a second virtual address associated with the second instruction. For example, a first buffer (e.g., the first buffer 406) may store the at least part of the first virtual address associated with the first instruction, and a second buffer (e.g., the second buffer 408) may store the at least part of the second virtual address associated with the second instruction. A comparator (e.g., the comparator 410) may compare the at least part of the first virtual address with the at least part of the second virtual address. If the at least part of the first virtual address equals the at least part of the second virtual address, the comparator may send the indication that the first memory request is a candidate for combination (e.g., with another memory request, such as the second memory request). The comparator may send the indication to the transaction bundler via the first bus. If the at least part of the first virtual address does not equal the at least part of the second virtual address, the comparator does not send the indication. Thus, the processor core, via the indication circuitry, may speculate, at a relatively early stage using virtual addresses, whether there is a probability that the first and second memory requests will be directed to physical addresses that are consecutive addresses, or addresses on a same page, and should therefore be combined in a combined memory request.

In some implementations, the comparator may send the indication when the comparator determines that the at least part of the second virtual address, stored in the second buffer, is adjacent to the at least part of the first virtual address stored in the first buffer. This may permit the possibility of bundling memory transactions to addresses when there is a probability that the physical addresses associated with the transactions are consecutive addresses. In some implementations, the comparator may send the indication when a page that is addressed by the second instruction is a same page as a page that is addressed by the first instruction. In some implementations, the indication circuitry may determine when an offset portion of the second virtual address is adjacent to an offset portion of the first virtual address, and may send the indication based on the determination. This may permit the possibility of bundling memory transactions to the same page when there is a probability that the physical addresses associated with the transactions are on the same page.

At 640, the processor core may send the indication to a transaction bundler, via the first bus, that the first memory request is a candidate for combination. The processor core may send the indication in response to the determination that the first memory request is a candidate for combination with the second memory request. The indication may be sent to the transaction bundler to cause the transaction bundler to wait for a specified period of time for the possibility of combining the first memory request with the second memory request that is being processed by the processor core.

Figure 7:
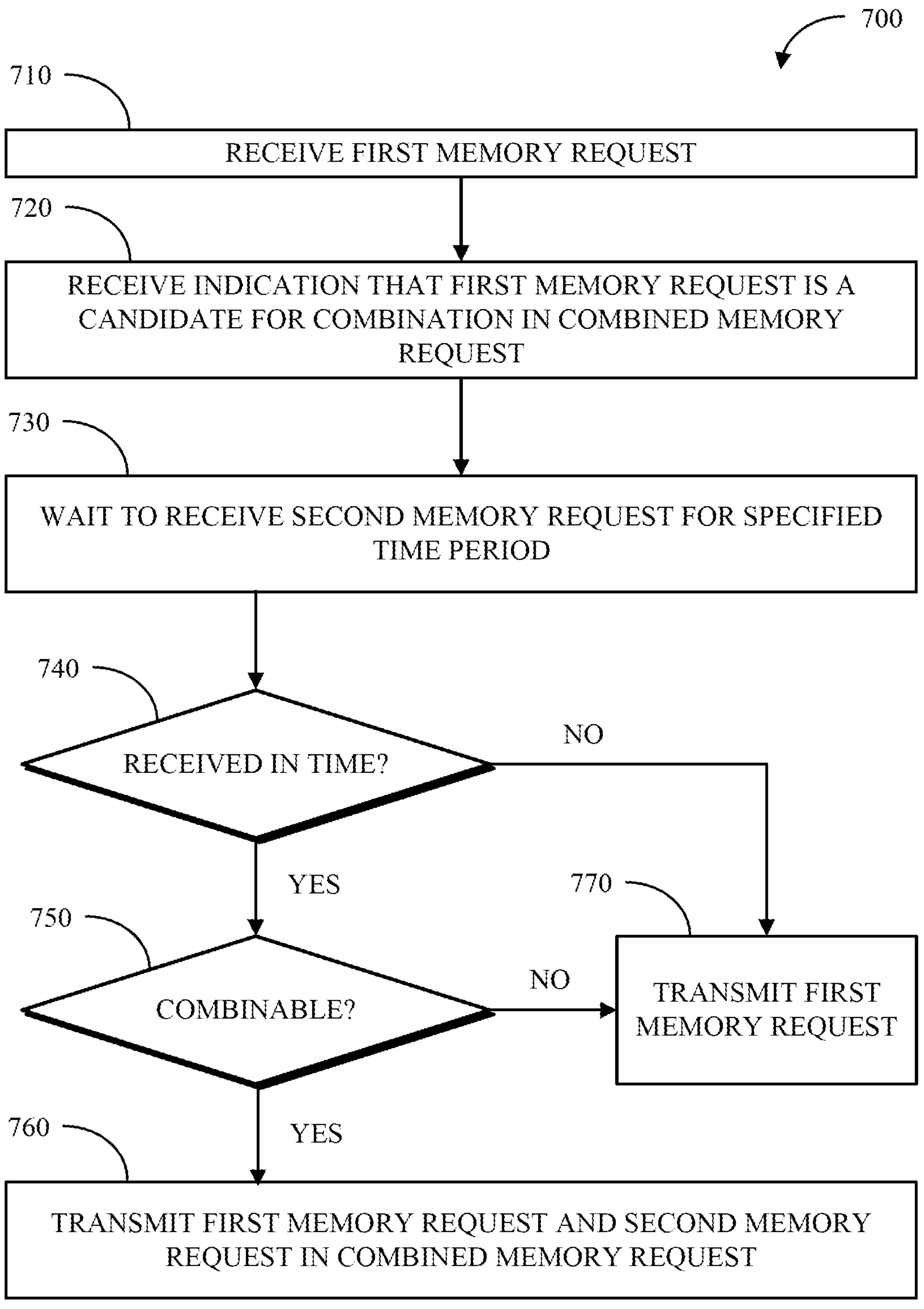
FIG. 7 is a flow chart of an example of a technique for combining a first memory request and a second memory request at a transaction bundler.

FIG. 7 is a flow chart of an example of a technique 700 for combining a memory request at a transaction bundler (e.g., the transaction bundler 190, the transaction bundler 290, or the transaction bundler 490). In some implementations, the transaction bundler 108 may be implemented by an FPGA, an ASIC, or an SoC. In some implementations, the transaction bundler 108 may be implemented in or with a cache controller or a memory controller, such as for scheduling accesses to cache or memory banks. In some implementations, the transaction bundler 108 may be implemented in or with an NoC.

At 710, the transaction bundler may receive a first memory request. The first memory request may be transmitted by a processor core (e.g., the processor core 106, the processor core 206, or the processor core 306) via a first bus (e.g., the first bus 120 or the first bus 220). The first memory request may be a first memory read or a first memory write. The first memory request may be an earlier memory request.

At 720, the transaction bundler may receive an indication, from the processor core via the first bus, that the first memory request is a candidate for combination in a combined memory request. The indication may be associated with, or in connection with, the first memory request. The processor core may determine that the first memory request is a candidate for combination with the second memory request via indication circuitry (e.g., the indication circuitry 402).

At 730, the transaction bundler may wait, in response to the indication, to receive the second memory request, for a specified time period. The specified period of time may be configurable (e.g., 2, 3, 4, or 5 clock cycles). At 740, the transaction bundler may determine whether the second memory request arrives within the specified time period. If the second memory request does not arrive within the specified time period ("No"), then at 770, the transaction bundler may transmit the first memory request (e.g., without the second memory request). At 740, if the second memory request does arrive within the specified time period ("Yes"), then at 750, the transaction bundler may determine whether the second memory request is combinable with the first memory request. In some implementations, the transaction bundler may determine that the second memory request is combinable with the first memory request when a physical address associated with the second memory request is consecutive to a physical address associated with the first memory request, or when a page that is physically addressed by the second memory request is a same page as a page that is physically addressed by the first memory request. In some implementations, the transaction bundler may determine when an offset portion that is physically addressed by the second memory request is adjacent to an offset portion that is physically addressed by the first memory request, and may send the indication based on the determination. In some implementations, the transaction bundler may determine that the second memory request is combinable with the first memory request when a bandwidth over the second bus (e.g., the second bus 122 or the second bus 222) is equal to or greater than a data size associated with the second memory request and the first memory requests in combination with one another. In some implementations, the transaction bundler may determine that the second memory request is combinable with the first memory request when the second memory request and the first memory request are both read requests or write requests.

At 750, if the second memory request is not combinable with the first memory request ("No"), then at 770, the transaction bundler may transmit the first memory request (e.g., without combining with the second memory request), then may transmit the second memory request. At 750, if the second memory request is combinable with the first memory request ("Yes"), then at 760 the transaction bundler may combine the first memory request with the second memory request in a combined memory request. The combined memory request may be sent, for example to a memory system (e.g., the memory system 104) or an NoC (e.g., the NoC 204) via the second bus.

Figure 8:
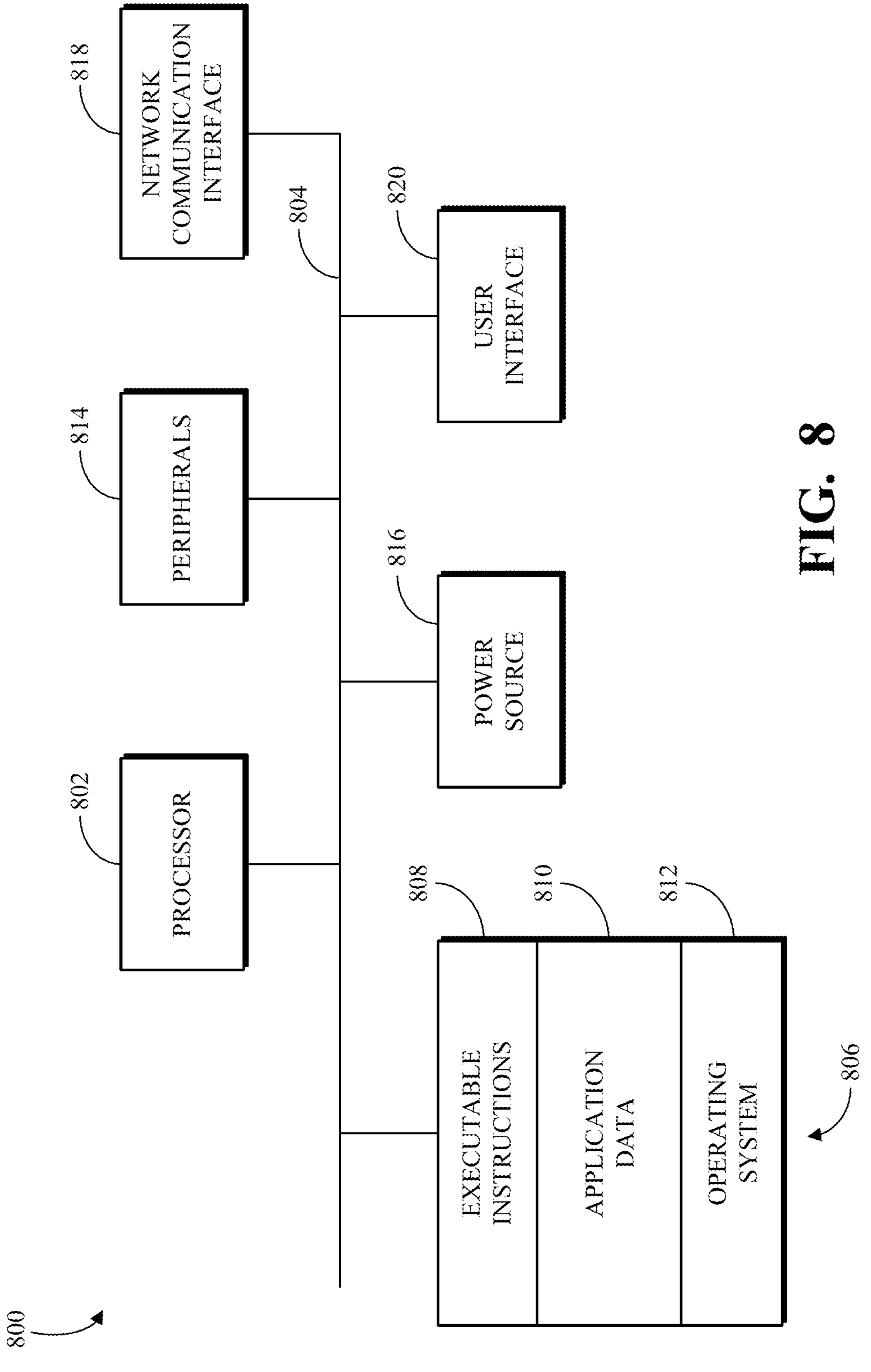
FIG. 8 is a block diagram of an example of a system for facilitating generation of a circuit representation.

FIG. 8 is a block diagram of an example of a system 800 for facilitating generation of a circuit representation, and/or for programming or manufacturing an integrated circuit. The system 800 is an example of an internal configuration of a computing device. For example, the system 800 may be used to generate a file that generates a circuit representation of an integrated circuit (e.g., the integrated circuit 102 or the integrated circuit 202), including a processor core (e.g., the processor core 106, the processor core 206, or the processor core 306) and a transaction bundler (e.g., the transaction bundler 190, the transaction bundler 290, or the transaction bundler 490). The system 800 can include components or units, such as a processor 802, a bus 804, a memory 806, peripherals 814, a power source 816, a network communication interface 818, a user interface 820, other suitable components, or a combination thereof.

The processor 802 can be a central processing unit (CPU), such as a microprocessor, and can include single or multiple processors having single or multiple processing cores. Alternatively, the processor 802 can include another type of device, or multiple devices, now existing or hereafter developed, capable of manipulating or processing information. For example, the processor 802 can include multiple processors interconnected in any manner, including hardwired or networked, including wirelessly networked. In some implementations, the operations of the processor 802 can be distributed across multiple physical devices or units that can be coupled directly or across a local area or other suitable type of network. In some implementations, the processor 802 can include a cache, or cache memory, for local storage of operating data or instructions.

The memory 806 can include volatile memory, non-volatile memory, or a combination thereof. For example, the memory 806 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 806 can include another type of device, or multiple devices, now existing or hereafter developed, capable of storing data or instructions for processing by the processor 802. The processor 802 can access or manipulate data in the memory 806 via the bus 804. Although shown as a single block in FIG. 8, the memory 806 can be implemented as multiple units. For example, a system 800 can include volatile memory, such as random access memory (RAM), and persistent memory, such as a hard drive or other storage.

The memory 806 can include executable instructions 808, data, such as application data 810, an operating system 812, or a combination thereof, for immediate access by the processor 802. The executable instructions 808 can include, for example, one or more application programs, which can be loaded or copied, in whole or in part, from non-volatile memory to volatile memory to be executed by the processor 802. The executable instructions 808 can be organized into programmable modules or algorithms, functional programs, codes, code segments, or combinations thereof to perform various functions described herein. For example, the executable instructions 808 can include instructions executable by the processor 802 to cause the system 800 to automatically, in response to a command, generate an integrated circuit design and associated test results based on a design parameters data structure. The application data 810 can include, for example, user files, database catalogs or dictionaries, configuration information or functional programs, such as a web browser, a web server, a database server, or a combination thereof. The operating system 812 can be, for example, Microsoft Windows®, macOS®, or Linux®; an operating system for a small device, such as a smartphone or tablet device; or an operating system for a large device, such as a mainframe computer. The memory 806 can comprise one or more devices and can utilize one or more types of storage, such as solid-state or magnetic storage.

The peripherals 814 can be coupled to the processor 802 via the bus 804. The peripherals 814 can be sensors or detectors, or devices containing any number of sensors or detectors, which can monitor the system 800 itself or the environment around the system 800. For example, a system 800 can contain a temperature sensor for measuring temperatures of components of the system 800, such as the processor 802. Other sensors or detectors can be used with the system 800, as can be contemplated. In some implementations, the power source 816 can be a battery, and the system 800 can operate independently of an external power distribution system. Any of the components of the system 800, such as the peripherals 814 or the power source 816, can communicate with the processor 802 via the bus 804.

The network communication interface 818 can also be coupled to the processor 802 via the bus 804. In some implementations, the network communication interface 818 can comprise one or more transceivers. The network communication interface 818 can, for example, provide a connection or link to a network, via a network interface, which can be a wired network interface, such as Ethernet, or a wireless network interface. For example, the system 800 can communicate with other devices via the network communication interface 818 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 820 can include a display; a positional input device, such as a mouse, touchpad, touchscreen, or the like; a keyboard; or other suitable human or machine interface devices. The user interface 820 can be coupled to the processor 802 via the bus 804. Other interface devices that permit a user to program or otherwise use the system 800 can be provided in addition to or as an alternative to a display. In some implementations, the user interface 820 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 814. The operations of the processor 802 can be distributed across multiple clients or servers, which can be coupled directly or across a local area or other suitable type of network. The memory 806 can be distributed across multiple clients or servers, such as network-based memory or memory in multiple clients or servers performing the operations of clients or servers. Although depicted here as a single bus, the bus 804 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming. In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Some implementations may include an apparatus that includes a processor core including circuitry configured to: fetch a first instruction configured to cause a first memory request followed by a second instruction configured to cause a second memory request; determine that the first memory request is a candidate for combination with the second memory request; and responsive to the determination, send an indication, from the processor core via a bus, that the first memory request is a candidate for combination. In some implementations, the apparatus may include a transaction bundler configured to: receive the first memory request, the second memory request, and the indication from the processor core; based on the indication, combine the first memory request and the second memory request into a combined memory request; and transmit the combined memory request. In some implementations, the apparatus may include a transaction bundler configured to: receive the first memory request and the indication from the processor core; wait to receive the second memory request for a specified time period; and transmit the first memory request without combination with the second memory request if the second memory request is not received within the specified time period. In some implementations, the apparatus may include a transaction bundler configured to: receive the first memory request, the second memory request, and the indication from the processor core; and transmit the first memory request followed by the second memory request if the transaction bundler determines that the first memory request and the second memory request are not combinable. In some implementations, the circuitry includes a pipeline, and the circuitry is configured to send the indication when the second instruction is in the pipeline. In some implementations, the circuitry is configured to compare at least part of a first virtual address associated with the first instruction with at least part of a second virtual address associated with the second instruction for sending the indication. In some implementations, the circuitry includes a load/store execution unit, and the circuitry is configured to send the indication when the second instruction enters the load/store execution unit. In some implementations, the circuitry is configured to: determine when a second address associated with the second instruction is adjacent to a first address associated with the first instruction; and send the indication based on the determination. In some implementations, the circuitry is configured to: determine when a page that is addressed by the second instruction is a same page as a page that is addressed by the first instruction; and send the indication based on the determination.

Some implementations may include a method that includes fetching, by a processor core, a first instruction configured to cause a first memory request followed by a second instruction configured to cause a second memory request; determining that the first memory request is a candidate for combination with the second memory request; and responsive to the determination, sending an indication, from the processor core via a bus, that the first memory request is a candidate for combination. In some implementations, the method may include receiving, by a transaction bundler, the first memory request, the second memory request, and the indication from the processor core; based on the indication, combining the first memory request and the second memory request into a combined memory request; and transmitting the combined memory request. In some implementations, the method may include receiving, by a transaction bundler, the first memory request and the indication from the processor core; waiting to receive the second memory request for a specified time period; and transmitting the first memory request without combination with the second memory request if the second memory request is not received within the specified time period. In some implementations, the method may include receiving, by a transaction bundler, the first memory request, the second memory request, and the indication from the processor core; and transmitting the first memory request followed by the second memory request if the transaction bundler determines that the first memory request and the second memory request are not combinable. In some implementations, the method may include sending the indication when the second instruction is in a pipeline of the processor core. In some implementations, the method may include comparing at least part of a first virtual address associated with the first instruction with at least part of a second virtual address associated with the second instruction for sending the indication. In some implementations, the method may include sending the indication when the second instruction enters a load/store execution unit of the processor core. In some implementations, the method may include determining when a second address associated with the second instruction is adjacent to a first address associated with the first instruction; and sending the indication based on the determination. In some implementations, the method may include determining when a page that is addressed by the second instruction is a same page as a page that is addressed by the first instruction; and sending the indication based on the determination.

Some implementations may include a non-transitory computer readable medium comprising a circuit representation that, when processed by a computer, is used to program or manufacture an integrated circuit comprising: a processor core including circuitry that: executes a first instruction configured to cause a first memory request followed by a second instruction configured to cause a second memory request; determines that the first memory request is a candidate for combination with the second memory request; and responsive to the determination, sends an indication, from the processor core via a bus, that the first memory request is a candidate for combination. In some implementations, the circuit representation, when processed by the computer, is used to program or manufacture the integrated circuit comprising: a transaction bundler that: receives the first memory request, the second memory request, and the indication from the processor core; based on the indication, combines the first memory request and the second memory request into a combined memory request; and transmits the combined memory request. In some implementations, the circuit representation, when processed by the computer, is used to program or manufacture the integrated circuit comprising: a transaction bundler that: receives the first memory request and the indication from the processor core; waits to receive the second memory request for a specified time period; and transmits the first memory request without combination with the second memory request if the second memory request is not received within the specified time period. In some implementations, the circuit representation, when processed by the computer, is used to program or manufacture the integrated circuit comprising: a transaction bundler that: receives the first memory request, the second memory request, and the indication from the processor core; and transmits the first memory request followed by the second memory request if the transaction bundler determines that the first memory request and the second memory request are not combinable. In some implementations, the circuit representation, when processed by the computer, is used to program or manufacture the integrated circuit with the processor core including circuitry that: comprises a pipeline; and sends the indication when the second instruction is in the pipeline. In some implementations, the circuit representation, when processed by the computer, is used to program or manufacture the integrated circuit with the processor core including circuitry that: compares at least part of a first virtual address associated with the first instruction with at least part of a second virtual address associated with the second instruction for sending the indication. In some implementations, the circuit representation, when processed by the computer, is used to program or manufacture the integrated circuit with the processor core including circuitry that: comprises a load/store execution unit; and sends the indication when the second instruction enters the load/store execution unit. In some implementations, the circuit representation, when processed by the computer, is used to program or manufacture the integrated circuit with the processor core including circuitry that: determines when a second address associated with the second instruction is adjacent to a first address associated with the first instruction; and sends the indication based on the determination. In some implementations, the circuit representation, when processed by the computer, is used to program or manufacture the integrated circuit with the processor core including circuitry that: determines when a page that is addressed by the second instruction is a same page as a page that is addressed by the first instruction; and sends the indication based on the determination. In some implementations, the circuit representation, when processed by the computer, is used to program or manufacture the integrated circuit comprising at least one of: a network-on-a-chip; a cache controller; or a memory controller. In some implementations, the circuit representation, when processed by the computer, is used to program or manufacture the integrated circuit comprising: a transaction bundler that: receives the first memory request and the second memory request from the processor core via the bus; and based on the indication, transmits the first memory request and the second memory request as a combined memory request via a second bus. In some implementations, the circuit representation, when processed by the computer, is used to program or manufacture the integrated circuit with the first memory request and the second memory request comprising a first read and a second read or a first write and a second write. In some implementations, the circuit representation comprises at least one of: a description of the integrated circuit; or a file that, when processed by the computer, generates the description of the integrated circuit.

Some implementations may include a non-transitory computer readable medium comprising a circuit representation that, when processed by a computer, is used to program or manufacture an integrated circuit comprising: a transaction bundler including circuitry that: receives, from a processor core via a bus, a first memory request and an indication that the first memory request is a candidate for combination; and based on the indication, waits to receive a second memory request for a specified time period. In some implementations, the circuit representation, when processed by the computer, is used to program or manufacture the integrated circuit with the transaction bundler including circuitry that: receives the second memory request; based on indication, combines the first memory request and the second memory request into a combined memory request; and transmits the combined memory request. In some implementations, the circuit representation, when processed by the computer, is used to program or manufacture the integrated circuit with the transaction bundler including circuitry that: receives the second memory request; and transmits the first memory request without combination with the second memory request if the second memory request is not received within the specified time period. In some implementations, the circuit representation, when processed by the computer, is used to program or manufacture the integrated circuit with the transaction bundler including circuitry that: receives the second memory request; and transmits the first memory request followed by the second memory request if the transaction bundler determines that the first memory request and the second memory request are not combinable. In some implementations, the circuit representation, when processed by the computer, is used to program or manufacture the integrated circuit comprising: a processor core including a pipeline, wherein the processor core: executes a first instruction configured to cause the first memory request followed by a second instruction configured to cause the second memory request; and sends the indication when the second instruction is in the pipeline. In some implementations, the circuit representation, when processed by the computer, is used to program or manufacture the integrated circuit with the transaction bundler including circuitry that: compares at a first physical address associated with the first memory request with a second physical address associated with the second memory request for determining a combination of the first memory request and the second memory request into a combined memory request. In some implementations, the circuit representation, when processed by the computer, is used to program or manufacture the integrated circuit with the transaction bundler including circuitry that: combines the first memory request and the second memory request into a combined memory request when a second address associated with the second memory request is adjacent to a first address associated with the first memory request; and transmits the combined memory request. In some implementations, the circuit representation, when processed by the computer, is used to program or manufacture the integrated circuit with the transaction bundler including circuitry that: combines the first memory request and the second memory request into a combined memory request when a page that is addressed by the second memory request is a same page as a page that is addressed by the first memory request; and transmits the combined memory request. In some implementations, the circuit representation, when processed by the computer, is used to program or manufacture the integrated circuit with the transaction bundler comprising at least one of: a network-on-a-chip; a cache controller; or a memory controller. In some implementations, the circuit representation comprises at least one of: a description of the integrated circuit; or a file that, when processed by the computer, generates the description of the integrated circuit. In some implementations, the indication is a first indication, and the circuit representation, when processed by the computer, is used to program or manufacture the integrated circuit with the transaction bundler including circuitry that: receives multiple indications including the first indication; and combines three or more memory requests, including the first memory request and the second memory request, into a combined memory request based on the multiple indications. In some implementations, the circuit representation, when processed by the computer, is used to program or manufacture the integrated circuit with a processor core including a pipeline, wherein the processor core determines the indication while looking up the second memory request in a local cache of the processor core. In some implementations, the circuit representation, when processed by the computer, is used to program or manufacture the integrated circuit with a processor core including a pipeline, wherein the processor core determines the indication while performing virtual to physical address translation for a memory address associated with the second instruction.

Some implementations may include an apparatus that includes a transaction bundler including circuitry configured to: receive, from a processor core via a bus, a first memory request and an indication that the first memory request is a candidate for combination; and based on the indication, wait to receive the second memory request for a specified time period. In some implementations, the circuitry may be configured to receive the second memory request; based on indication, combines the first memory request and the second memory request into a combined memory request; and transmits the combined memory request. In some implementations, the circuitry may be configured to receive the second memory request; and transmits the first memory request without combination with the second memory request if the second memory request is not received within the specified time period. In some implementations, the circuitry may be configured to: receive the second memory request; and transmit the first memory request followed by the second memory request if the transaction bundler determines that the first memory request and the second memory request are not combinable. In some implementations, the apparatus may include a processor core including a pipeline, wherein the processor core is configured to: execute a first instruction configured to cause the first memory request followed by a second instruction configured to cause the second memory request; and send the indication when the second instruction is in the pipeline. In some implementations, the circuitry may be configured to: compare at a first physical address associated with the first memory request with a second physical address associated with the second memory request for determining a combination of the first memory request and the second memory request into a combined memory request. In some implementations, the circuitry may be configured to: combine the first memory request and the second memory request into a combined memory request when a second address associated with the second memory request is adjacent to a first address associated with the first memory request; and transmit the combined memory request. In some implementations, the circuitry may be configured to: combine the first memory request and the second memory request into a combined memory request when a page that is addressed by the second memory request is a same page as a page that is addressed by the first memory request; and transmit the combined memory request. In some implementations, the indication is a first indication, and the circuitry may: receive multiple indications including the first indication; and combine three or more memory requests, including the first memory request and the second memory request, into a combined memory request based on the multiple indications. In some implementations, the processor core may include a pipeline, wherein the processor core determines the indication while looking up the second memory request in a local cache of the processor core. In some implementations, the processor core may include, wherein the processor core determines the indication while performing virtual to physical address translation for a memory address associated with the second instruction.

Some implementations may include a method that includes: receiving, from a processor core via a bus, a first memory request and an indication that the first memory request is a candidate for combination; and based on the indication, waiting to receive a second memory request for a specified time period. In some implementations, the method may include receiving the second memory request; based on indication, combining the first memory request and the second memory request into a combined memory request; and transmitting the combined memory request. In some implementations, the method may include receiving the second memory request; and transmitting the first memory request without combination with the second memory request if the second memory request is not received within the specified time period. In some implementations, the method may include receiving the second memory request; and transmitting the first memory request followed by the second memory request if the first memory request and the second memory request are not combinable. In some implementations, the method may include executing, by a processor core, a first instruction configured to cause the first memory request followed by a second instruction configured to cause the second memory request; and sending, by the processor core, the indication when the second instruction is in the pipeline. In some implementations the method may include comparing at a first physical address associated with the first memory request with a second physical address associated with the second memory request for determining a combination of the first memory request and the second memory request into a combined memory request. In some implementations, the method may include combining the first memory request and the second memory request into a combined memory request when a second address associated with the second memory request is adjacent to a first address associated with the first memory request; and transmitting the combined memory request. In some implementations, the method may include combining the first memory request and the second memory request into a combined memory request when a page that is addressed by the second memory request is a same page as a page that is addressed by the first memory request; and transmitting the combined memory request. In some implementations, the indication is a first indication, and the method may include receiving multiple indications including the first indication; and combining three or more memory requests, including the first memory request and the second memory request, into a combined memory request based on the multiple indications. In some implementations, the method may include determining, by a processor core, the indication while the processor core looks up the second memory request in a local cache of the processor core. In some implementations, the method may include determining, by a processor core, the indication while the processor core performs virtual to physical address translation for a memory address associated with the second instruction.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An apparatus, comprising:

a processor core including circuitry configured to:

fetch a first instruction configured to cause a first memory request followed by a second instruction configured to cause a second memory request;

while the second instruction is still in an instruction execution pipeline of the processor core, determine that the first memory request is a candidate for combination with the second memory request; and responsive to the determination, send an indication, from the processor core via a bus, that the first memory request is a candidate for combination; and a transaction bundler configured to:

receive the first memory request and the indication from the processor core; and determine whether the second memory request is received by the transaction bundler within a specified time period.

2. The apparatus of claim 1, wherein, to determine whether the second memory request is received by the transaction bundler within a specified time, the transaction bundler is configured to determine that the second memory request is received within the specified time, and the transaction bundler is further configured to:

based on the indication and determination that the second memory request is received within the specified time, combine the first memory request and the second memory request into a combined memory request; and transmit the combined memory request.

3. The apparatus of claim 1, wherein, to determine whether the second memory request is received by the transaction bundler within a specified time, the transaction bundler is configured to determine that the second memory request is not received within the specified time, and the transaction bundler is further configured to:

wait to receive the second memory request for a specified time period; and transmit the first memory request without combination with the second memory request based on determination that the second memory request is not received within the specified time.

4. The apparatus of claim 1, wherein the transaction bundler is further configured to:

receive the second memory request; and transmit the first memory request followed by the second memory request based on-determining that the first memory request and the second memory request are not combinable.

5. The apparatus of claim 1, wherein the circuitry is configured to send the indication while the second instruction is still in the instruction execution pipeline.

6. The apparatus of claim 1, wherein the circuitry is configured to compare at least part of a first virtual address associated with the first instruction with at least part of a second virtual address associated with the second instruction for sending the indication.

7. The apparatus of claim 1, wherein the circuitry includes a load/store execution unit, and wherein the circuitry is configured to send the indication when the second instruction enters the load/store execution unit.

8. The apparatus of claim 1, wherein the circuitry is configured to:

determine when a second address associated with the second instruction is adjacent to a first address associated with the first instruction; and send the indication based on the determination.

9. The apparatus of claim 1, wherein the circuitry is configured to:

determine when a page that is addressed by the second instruction is a same page as a page that is addressed by the first instruction; and send the indication based on the determination.

10. A method, comprising:

fetching, by a processor core, a first instruction configured to cause a first memory request followed by a second instruction configured to cause a second memory request;

while the second instruction is still in an instruction execution pipeline of the processor core, determining that the first memory request is a candidate for combination with the second memory request;

responsive to the determination, sending an indication, from the processor core via a bus, that the first memory request is a candidate for combination;

receiving, by a transaction bundler, the first memory request and the indication from the processor core; and determining, by the transaction bundler, whether the second memory request is received by the transaction bundler within a specified time.

11. The method of claim 10, wherein said determining, by the transaction bundler, whether the second memory request is received by the transaction bundler within a specified time comprises determining that the second memory request is received by the transaction bundler within the specified time, and the method further comprises:

based on the indication and said determining that the second memory request is received by the transaction bundler within the specified time, combining the first memory request and the second memory request into a combined memory request; and transmitting the combined memory request.

12. The method of claim 10, further comprising:

receiving, by a transaction bundler, the first memory request and the indication from the processor core;

waiting to receive the second memory request for a specified time period; and transmitting the first memory request without combination with the second memory request based on said determining that the second memory request is not received within the specified time period.

13. The method of claim 10, further comprising:

receiving, by a transaction bundler, the second memory request from the processor core; and transmitting the first memory request followed by the second memory request based on determining, by the transaction bundler, that the first memory request and the second memory request are not combinable.

14. The method of claim 10, further comprising:

sending the indication while the second instruction is still in the pipeline.

15. The method of claim 10, further comprising:

comparing at least part of a first virtual address associated with the first instruction with at least part of a second virtual address associated with the second instruction for sending the indication.

16. The method of claim 10, further comprising:

sending the indication when the second instruction enters a load/store execution unit of the processor core.

17. The method of claim 10, further comprising:

determining when a second address associated with the second instruction is adjacent to a first address associated with the first instruction; and sending the indication based on the determination.

18. The method of claim 10, further comprising:

determining when a page that is addressed by the second instruction is a same page as a page that is addressed by the first instruction; and sending the indication based on the determination.

19. A non-transitory computer readable medium comprising a circuit representation that, when processed by a computer, is used to program or manufacture an integrated circuit comprising:

a processor core including circuitry that:

executes a first instruction configured to cause a first memory request followed by a second instruction configured to cause a second memory request;

while the second instruction is still in an instruction execution pipeline of the processor core, determines that the first memory request is a candidate for combination with the second memory request; and responsive to the determination, sends an indication, from the processor core via a bus, that the first memory request is a candidate for combination; and a transaction bundler to:

receive the first memory request and the indication from the processor core; and determine whether the second memory request is received by the transaction bundler within a specified time period.

20. The non-transitory computer readable medium of claim 19, wherein the circuit representation, when processed by the computer, is used to program or manufacture the integrated circuit comprising the transaction bundler, wherein to determine whether the second memory request is received by the transaction bundler within a specified time period, the transaction bundler is to determine that the second memory request is received by the transaction bundler, and the transaction bundler is further to:

receives the second memory request from the processor core;

based on the indication and determination that the second memory request is received within the specified time, combines the first memory request and the second memory request into a combined memory request; and transmits the combined memory request.

* * * * *